(12) United States Patent
Yanase

(10) Patent No.: US 8,495,070 B2
(45) Date of Patent: Jul. 23, 2013

(54) LOGIC OPERATION SYSTEM

(76) Inventor: Takatoshi Yanase, Hyogo (JP)

( * ) Notice: Subject to any disclaimer, the term of this patent is extended or adjusted under 35 U.S.C. 154(b) by 0 days.

(21) Appl. No.: 13/610,420

(22) Filed: Sep. 11, 2012

(65) Prior Publication Data

US 2013/0007019 A1     Jan. 3, 2013

Related U.S. Application Data

(63) Continuation of application No. PCT/JP2011/064249, filed on Jun. 22, 2011.

(30) Foreign Application Priority Data

Jul. 2, 2010   (JP) .................................. 2010-151686
Feb. 16, 2011  (JP) .................................. 2011-030338

(51) Int. Cl.
*G06F 7/00*     (2006.01)
*G06F 17/30*    (2006.01)

(52) U.S. Cl.
USPC ........................................ 707/749; 707/778

(58) Field of Classification Search
USPC .......................... 707/738, 749, 772, 777, 778
See application file for complete search history.

(56) References Cited

U.S. PATENT DOCUMENTS

| | | | |
|---|---|---|---|
| 5,524,177 | A | 6/1996 | Suzuoka |
| 7,606,817 | B2 * | 10/2009 | Carter ................... 1/1 |
| 7,743,054 | B2 | 6/2010 | Sasai |
| 2003/0041047 | A1 * | 2/2003 | Chang et al. ...................... 707/1 |
| 2005/0240579 | A1 | 10/2005 | Sasai |
| 2010/0161580 | A1 * | 6/2010 | Chipman et al. ............... 707/706 |
| 2012/0072387 | A1 * | 3/2012 | Yanase ............................ 706/50 |
| 2012/0313948 | A1 * | 12/2012 | Bergman et al. ............... 345/440 |

FOREIGN PATENT DOCUMENTS

| | | |
|---|---|---|
| JP | 5-233707 | 9/1993 |
| JP | 6-19871 | 1/1994 |
| JP | 2005-316573 | 11/2005 |

OTHER PUBLICATIONS

Mezaris et. al. Region-based image retrieval using an object ontology and relevance feedback. Jan. 2004. EURASIP Journal on Applied Signal Processing. pp. 886-901.*
Takatoshi Yanase, "The information system where object is base unit of knowledge", Applet Server System Lab, Jan. 18, 2010 with English abstract.
International Search Report (in English language) issued in International (PCT) Application No. PCT/JP2011/064249 on Aug. 2, 2011.
"Neural Network Application", Advanced Telecommunications Research Institute International, first edition, Ohmsha, Ltd., Jul. 20, 1995, pp. 8-11, with partial English translation.

* cited by examiner

*Primary Examiner* — James E Richardson
(74) *Attorney, Agent, or Firm* — Wenderoth, Lind & Ponack, L.L.P.

(57) ABSTRACT

A storage unit stores at least one attribute each assigned an attribute identifier uniquely identifying the attribute. Each attribute identifier is associated with at least one piece of equivalent reference data each representing the attribute. Each attribute identifier is not a word representing the attribute, and is made of a symbol having no meaning per se. A weight of association between an attribute identifier and each of at least one piece of equivalent reference data represents a degree of relatedness between the attribute and the piece of equivalent reference data. An operation unit determines whether or not given data is the same as a piece of equivalent reference data, obtains a weight of association between the piece of equivalent reference data determined to be the same and an attribute identifier, and selects the attribute when a sum of at least one weight obtained for the attribute satisfies a predetermined condition.

9 Claims, 4 Drawing Sheets

LOGIC OPERATION SYSTEM

CROSS REFERENCE TO RELATED APPLICATIONS

This is a continuation application of PCT Patent Application No. PCT/JP2011/064249 filed on Jun. 22, 2011, designating the United States of America, which is based on and claims priority of Japanese Patent Applications No. 2010-151686 filed on Jul. 2, 2010 and No. 2011-030338 filed on Feb. 16, 2011. The entire disclosures of the above-identified applications, including the specifications, drawings and claims are incorporated herein by reference in their entirety.

FIELD

The present invention relates to a logic operation system.

BACKGROUND

In a tabular database made up of rows and columns, item values of the same item are stored in cells of the same column, and item values of respective items associated with each other are stored in cells of the same row. Item values of respective columns associated with each other constitute one row. There may be one or more cells in which no item value is stored.

It is possible to designate a column in the table, and select a row whose cell in the designated column stores a value designated beforehand or a value in a range designated beforehand. The designated column is called a search item, and the designated item value or item value range is called a search key.

The tabular database is searched by designating the search column and the search key and obtaining the row having the designated search key in the designated column.

In other words, rows in the tabular database are classified according to the search key. That is, the search key set beforehand enables classification. The search key is simply data expressed in letters.

There is a logic operation method called symbolic logic. For example, items which are logic variables denoted by A and B are related to each other in a form such as "A OR B" or "A AND B". Here, the relatedness between items is uniformly of the same strength. A method of performing logic operations, search, or inference using such symbolic logic is available. Not only a simple search condition using a single search key but also a more complex search condition can be generated by connecting a plurality of search keys by one or more logic operators such as AND, OR, NOT, and so on. In this method, association between items in a logic expression is fixed.

There is an inference technique called a Bayesian network. An event is regarded as an abstract entity. An abstract entity A and an abstract entity B are associated with each other, and a numeric value is added to the association. The numeric value is a probability of "If B then A". When B is associated with A and also an abstract entity C which is an event is associated with A, combining the probability of A and B and a probability of A and C can yield a probability of "If B and C then A". Only in the case where there is a dependency relationship between B and C, the probability of B and the probability of C can be combined as mentioned above. Inference is performed by selecting an event associated at a higher probability.

There is a method of recognizing image data or the like by imitating connections between neurons called a neural network. In this method, one piece of input data is segmented into a plurality of pieces of data. For example, one piece of image data is partitioned like a grid. Each cell of the grid of the image data is assigned a numeric value representing brightness of the cell. Pattern data is generated by arranging these numeric value data in predetermined order. A weight is set for a position of each cell beforehand. A product of the numeric value data representing the brightness of each cell and the weight of the position corresponding to the numeric value data is calculated, and the calculated products are summed. Whether or not the sum exceeds a predetermined value is determined. In the case where the sum exceeds the predetermined value, a value representing "true" is outputted from the neural network. In this method, one piece of input data as a whole is not one logic variable, but each piece of data obtained by segmenting one piece of input data is a logic variable. A product of each input data segment and its corresponding weight is calculated, and the calculated products are summed. Thus, one piece of input data as a whole is not treated as one logic variable in a logic operation.

SUMMARY

In the conventional techniques, a logic expression is defined only by association between logic variables or association between events.

With the present invention a logic operation system includes: a storage unit that stores data; and an operation unit that performs an operation on the data stored in the storage unit, wherein the data stored in the storage unit includes at least one attribute each of which is assigned an attribute identifier for uniquely identifying the attribute, each attribute identifier is associated with at least one piece of equivalent reference data each of which is data representing the corresponding attribute, for each attribute identifier, the number of sets of association between the attribute identifier and at least one piece of equivalent reference data is one, each attribute identifier is not a word representing the corresponding attribute, and is made of a symbol that has no meaning per se, each piece of equivalent reference data is feature data or identification data, the feature data being a substance of an associated attribute, and the identification data being data for identifying the associated attribute, the data stored in the storage unit includes, for each attribute identifier, a weight of association between the attribute identifier and each of at least one piece of equivalent reference data, the weight representing a degree of relatedness between the corresponding attribute and the piece of equivalent reference data associated with each other, and the operation unit: when data is given, determines whether or not the given data is the same as a piece of equivalent reference data; when the given data is determined to be the same as the piece of equivalent reference data, obtains a weight of association between the piece of equivalent reference data determined to be the same and an attribute identifier; when at least one weight is obtained for the attribute identifier, calculates a sum of the at least one weight obtained for the attribute identifier; and when the sum of the at least one weight obtained for the attribute identifier is calculated, selects the attribute identifier in the case where the sum satisfies a predetermined condition.

According to this structure, the attribute can be selected in the case where the sum of the obtained at least one weight satisfies the predetermined condition.

The operation unit may: when data is given, determine whether or not the given data is the same as a piece of equivalent reference data; when the given data is determined to be the same as the piece of equivalent reference data, obtain a weight of association between the piece of equivalent reference data determined to be the same and an attribute identifier; when at least one weight is obtained for the attribute identifier, calculate a sum of the at least one weight obtained for the attribute identifier; select the attribute identifier in the case where the sum satisfies a predetermined condition; and, when the attribute identifier is selected, further select any piece of equivalent reference data associated with the selected attribute identifier.

According to this structure, any piece of equivalent reference data associated with the selected attribute can be selected.

The data stored in the storage unit may include at least one entity identifier each for uniquely identifying an entity, and at least one attribute of the entity where the at least one attribute is associated with the entity identifier, wherein for each entity identifier, the number of sets of association between the entity identifier and at least one attribute identifier of respective at least one attribute is one, and each entity identifier is not a word representing the corresponding entity, and is made of a symbol that has no meaning per se.

According to this structure, the entity identifier is associated with at least one attribute.

The data stored in the storage unit may include, for each entity identifier, a weight of association between the entity identifier and each of at least one attribute identifier, the weight representing a degree of relatedness between the entity identifier and the attribute identifier associated with each other, wherein the operation unit: when an attribute identifier is selected, obtains a weight of association between the selected attribute identifier and an entity identifier; when at least one weight is obtained for the entity identifier, calculates a sum of the at least one weight obtained for the entity identifier; and selects the entity identifier in the case where the sum satisfies a predetermined condition.

According to this structure, the entity identifier can be selected in the case where the sum of the obtained at least one weight satisfies the predetermined condition.

The operation unit may: when an attribute identifier is selected, obtain a weight of association between the selected attribute identifier and an entity identifier; when at least one weight is obtained for the entity identifier, calculate a sum of the at least one weight obtained for the entity identifier; select the entity identifier in the case where the sum satisfies a predetermined condition; and, when the entity identifier is selected, further select any attribute identifier associated with the selected entity identifier.

According to this structure, once the entity identifier is selected, any attribute associated with the selected entity identifier can be selected.

An entity identifier may be associated with an other entity identifier, wherein the operation unit, when an entity identifier is selected, selects an other entity associated with the selected entity identifier.

According to this structure, the other entity associated with the selected entity can be selected.

The data stored in the storage unit may include a weight of association between an entity identifier and an other entity identifier, the weight representing a degree of relatedness between the entity identifier and the other entity identifier associated with each other, wherein the operation unit: when an entity identifier is selected, obtains a weight of association between the selected entity identifier and an other entity identifier; when at least one weight is obtained for the other entity identifier, calculates a sum of the at least one weight obtained for the other entity identifier; and selects the other entity identifier in the case where the sum satisfies a predetermined condition.

According to this structure, the other entity can be selected in the case where the sum of the at least one weight obtained for the other entity satisfies the predetermined condition.

The operation unit may change the weight.

According to this structure, a weight of association between a piece of equivalent reference data and an attribute, a weight of association between an attribute and an entity, or a weight of association between entities can be changed.

Note that the present invention may be realized not only as a logic operation system or a logic operation device but also as an operation system, an operation device, a search system, a search device, an inference system, an inference device, or a knowledge base system including the logic operation system. For example, "(A AND B)$\Rightarrow$C" is a logic expression meaning "If A and B are true then C is true". The logic expression may be used as a search condition in a search system. In this case, search of selecting C if A and B are true is performed. The logic expression may also be used as an inference condition in an inference system. In this case, inference that if A and B are true then C is true is performed. Thus, the logic operation system according to the present invention may be realized as a search system or an inference system.

Moreover, the data structure according to the present invention in which an entity has an attribute and the attribute is associated with a piece of equivalent reference data may be used as a knowledge base. The present invention may then be realized as a knowledge base system that searches the knowledge base, through the use of the logic operation system according to the present invention.

The present invention may also be realized as a logic operation method including one or more steps of performing a characteristic process in the logic operation system, or a program causing a computer to execute such characteristic steps. The logic operation method is applicable as a search method or an inference method. The program may be distributed via a recording medium such as a CD-ROM or a transmission medium such as the Internet. A system or a device to which the present invention is applied may be realized in such a manner that one part of the system or the device is separated from the other part and communicates with the other part via a network.

The present invention may also be realized as a semiconductor integrated circuit (LSI) that wholly or partly achieves the functions of the logic operation system.

According to the present invention, input data is recognized by selecting equivalent reference data that is the same as the input data. When the input data is recognized, an attribute associated with the equivalent reference data is recognized. When the attribute is recognized, an entity associated with the attribute is recognized. Further, another entity associated with the recognized entity can be selected.

The present invention may be realized as a diagnostic support system or a diagnostic system that outputs a name of a possible disease upon input of medical interview data or image data of an X-ray photograph. The present invention may also be realized as an information system including the logic operation system according to the present invention, an information appliance including the search system according to the present invention, a robot that performs input data recognition or inference using the logic operation system according to the present invention, or a control system that performs logic operations and recognition on a plurality of pieces of input data using the logic operation system according to the present invention. The logic operation system according to the present invention can change logic expressions more easily than a conventional technique of incorporating logic expressions themselves into a computer system (computer program or computer data).

An attribute can be selected in the case where a sum of at least one weight obtained for the attribute satisfies a predetermined condition.

BRIEF DESCRIPTION OF DRAWINGS

These and other objects, advantages and features of the invention will become apparent from the following description thereof taken in conjunction with the accompanying drawings that illustrate a specific embodiment of the present invention.

DETAILED DESCRIPTION

Figure 4:
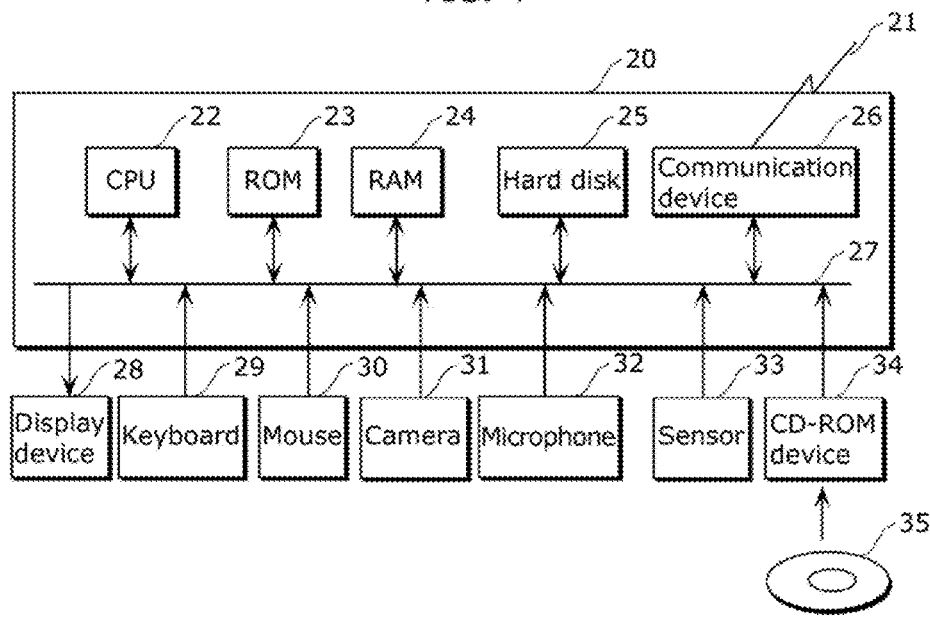
FIG. 4 is a block diagram showing a hardware structure of a computer system for realizing the logic operation system according to the embodiment of the present invention.

FIG. 4 is an example of a block diagram showing a structure of a computer system for realizing a logic operation system according to an embodiment of the present invention.

The computer system includes; a computer 20; a keyboard 29 and a mouse 30 for issuing instructions to the computer 20; a display device 28 for displaying information such as operation results of the computer 20; a camera 31 for inputting image data to the computer 20; a microphone 32 for inputting sound data to the computer 20; a sensor 33 for inputting data not converted to a language, such as a pressure, a temperature, a smell, a taste, and the like; and a CD-ROM (Compact Disk Read-Only Memory) device 34 for reading data and a program executed by the computer 20. The CD-ROM device 34 reads data and a program from a CD-ROM 35 which is a recording medium on which the data and the program are recorded.

An operation performed by an operator or the like may be detected from an image inputted from the camera to issue an instruction corresponding to the operation. A sound such as a speech sound inputted from the microphone may be received to issue an instruction corresponding to the sound. Though not shown in FIG. 4, data and a program may be read from a nonvolatile memory, such as a flash memory, which retains stored information even when not powered, instead of the CD-ROM device 34.

The computer 20 includes: a CPU (Central Processing Unit) 22; a ROM (Read Only Memory) 23; a RAM (Random Access Memory) 24; a hard disk 25; a communication device 26; and a bus 27. The communication device 26 communicates with a computer, a communication device, and the like (not shown) via a network 21.

Data and a program recorded on an auxiliary storage device such as the hard disk 25 or the CD-ROM device 34 are loaded into the RAM 24 which is a main storage device.

The ROM 23 stores a program and data necessary for operations of the computer 20. The CPU 22 loads a program and data from the hard disk 25 or the CD-ROM device 34 into the RAM 24. The CPU 22 executes the program loaded in the RAM 24. The CPU 22 reads/writes the data loaded in the RAM 24, according to a procedure indicated by the program loaded in the RAM 24. The CPU 22 also operates the data loaded in the RAM 24, according to the procedure indicated by the program loaded in the RAM 24. The bus 27 connects the CPU 22, the ROM 23, the RAM 24, the hard disk 25, the communication device 26, the display device 28, the keyboard 29, the mouse 30, the camera 31, the microphone 32, the sensor 33, and the CD-ROM device 34 to each other.

The components constituting the device described above may be wholly or partly connected via a network.

A plurality of computers 20 may be connected via the network 21 to form a logic operation system including the plurality of computers 20. Such a structure allows data of the logic operation system shown in FIG. 1 to be held in the plurality of computers 20 in a distributed manner. The plurality of computers 20 may include a computer 20 that includes the display device 28, the keyboard 29, and/or the mouse 30 to issue instructions. The plurality of computers 20 may include a computer 20 that includes the camera 31, the microphone 32, and/or the sensor 33 to input data.

Figure 1:
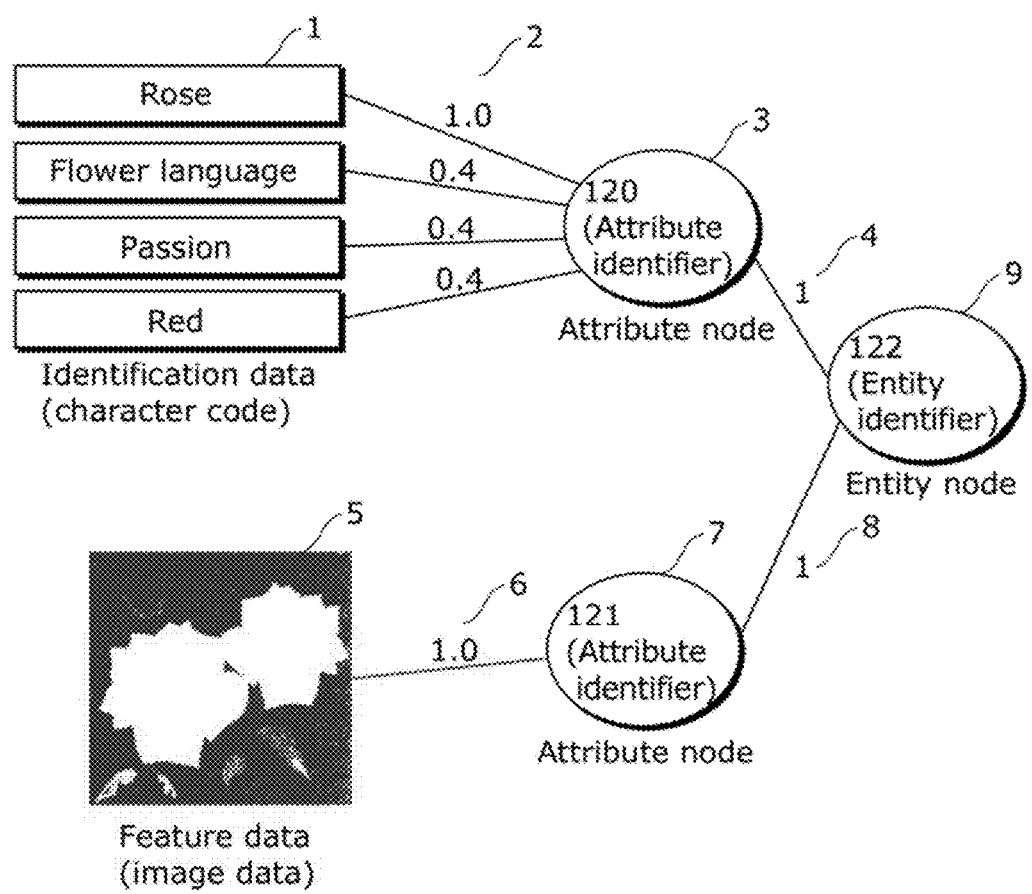
FIG. 1 is a diagram showing a data structure of a logic operation system according to an embodiment of the present invention.
Figure 2:
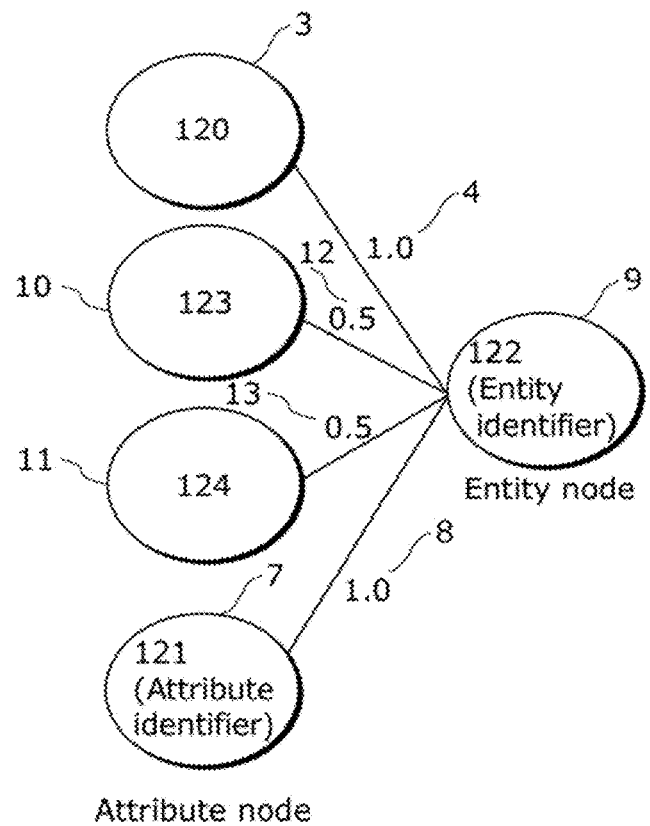
FIG. 2 is a diagram showing attribute nodes and an entity node in the data structure of the logic operation system according to the embodiment of the present invention.
Figure 3:
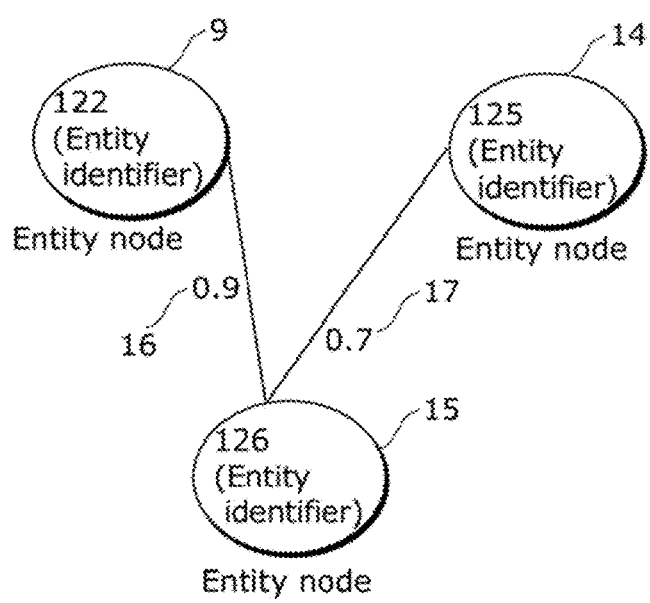
FIG. 3 is a diagram showing entity nodes in the data structure of the logic operation system according to the embodiment of the present invention.

A program and data of the logic operation system show FIGS. 1 to 3 are stored in the hard disk 25. The program for performing the process of the logic operation system is loaded into the RAM 24 and executed by the CPU 22. In the case of using the plurality of computers 20, the CPUs 22 exchange instructions and data via the network 21.

The following describes the embodiment of the present invention in detail, with reference to drawings. FIG. 1 is a diagram showing a data structure according to the embodiment of the present invention. Each of identification data and feature data directly associated with an attribute node is equivalent reference data. As an exception, identification data or feature data may be directly associated with an entity node, though not shown in FIG. 1. An attribute node is none of equivalent reference data, an entity node, and a weight. An entity node is none of equivalent reference data, an attribute node, and a weight. An attribute node is identified only by an attribute identifier which is not equivalent reference data, and the attribute node and the attribute identifier are in a one-to-one correspondence with each other. For each attribute identifier, there is only one set of association between the attribute identifier and an attribute node. For each attribute identifier, i.e. for each attribute, there is only one set of association between the attribute identifier and at least one piece of equivalent reference data, i.e. there is only one set of association between the attribute and at least one piece of equivalent reference data. An attribute node represents an attribute. An entity node is identified only by an entity identifier which is not equivalent reference data, and the entity node and the entity identifier are in a one-to-one correspondence with each other. For each entity identifier, there is only one set of association between the entity identifier and an entity node. For each entity identifier, i.e. for each entity, there is only one set of association between the entity identifier and at least one attribute identifier, i.e. there is only one set of association between the entity identifier and at least one attribute. An entity node represents an entity.

An attribute node and an entity node may be each divided into a plurality of nodes upon implementation. Conceptually, however, a plurality of attribute nodes and a plurality of entity nodes obtained by respectively dividing one attribute node and one entity node for implementation are the one attribute node and the one entity node before the division. In the case where, as an implementation constraint, there is an upper limit to the number of pieces of equivalent reference data that can be associated with one attribute node and there is an upper limit to the number of attribute nodes that can be associated with one entity node, the division enables association exceeding the upper limit. For each attribute node, there is only one set of association between the attribute node and at least one piece of equivalent reference data. For each entity node, there is only one set of association between the entity node and at least one attribute node. Equivalent reference data compared with given data is not divided into equivalent reference data segments which are each associated with an attribute node.

One attribute node 3 has only one attribute identifier 120. Only one weight 2 represents a strength of relatedness between identification data 1 and the attribute node 3. The weight 2 is 1.0. The attribute node 3 is connected to and associated with an entity node 9. The entity node 9 has only one entity identifier 122. Only one weight 4 may represent a strength of relatedness between the attribute node 3 and the entity node 9. The weight 4 is 1.0.

Feature data is a substance of a concept. Feature data 5 is connected to and associated with an attribute node 7. The attribute node 7 has only one attribute identifier 121. Only one weight 6 represents a strength of relatedness between the feature data 5 and the attribute node 7. The weight 6 is 1.0. The attribute node 7 is connected to and associated with the entity node 9. Only one weight 8 may represent a strength of relatedness between the attribute node 7 and the entity node 9. The weight 8 is 1.0.

Note that a weight is not a probability. No dependency relationship between pieces of equivalent reference data associated with the same attribute node is necessary. No dependency relationship between attribute nodes associated with the same entity node is necessary. A dependency relationship means that, as in an example where the primary school student population increases with an increase of the entire population, there is relatedness between two events which are the entire population increase and the primary school student population increase.

Only one weight is assigned to association between one piece of equivalent reference data and one attribute node. Only one weight is assigned to association between one attribute node and one entity node. Only one weight is assigned to association between one entity node and another entity node.

At least one of identification data and feature data is associated with an attribute node, as equivalent reference data. Neither an attribute identifier nor an entity identifier is compared with given data, unlike equivalent reference data. Neither an attribute identifier nor an entity identifier is used as data to be compared with equivalent reference data. An attribute identifier is used only to identify an attribute node, i.e. an attribute. An entity identifier is used only to identify an entity node, i.e. an entity. An attribute node and an attribute identifier are in a one-to-one correspondence with each other, and an entity node and an entity identifier are in a one-to-one correspondence with each other.

Equivalent reference data and an attribute node are associated with each other, without involving any other identification data, any other feature data, any other attribute node, or any entity node therebetween. Though it is possible to involve such data in the association, a limitation of not involving such data contributes to simpler processing.

An attribute node and an entity node are associated with each other, without involving any identification data, any feature data, any other attribute node, or any other entity node therebetween. Though it is possible to involve such data in the association, a limitation of not involving such data contributes to simpler processing.

An entity node and another entity node are directly associated with each other, without involving any identification data, any feature data, any attribute node, or any other entity node therebetween. Though it is possible to involve such data in the association, a limitation of not involving such data contributes to simpler processing.

Identification data is data relating to a word (both a single word and a sequence of words are hereafter collectively referred to as a word). Examples of identification data include a word expressed in a character code and sound data of a spoken word. A character code is data representing letters in the computer. Sound data is, for example, separated for each frequency band, an intensity of the sound is expressed by a numeric value for each frequency band, and these numeric values are arranged in predetermined order to form pattern data. Such pattern data is generated for each word. Generating pattern data for each word establishes association with the word.

A symbol may be associated with a word which is an element of a group beforehand. One example of this is an employee number associated with an employee name. The employee number is identification data. A symbol that partly represents a group is not an attribute identifier or an entity identifier, but a classification code. Equivalent reference data associated with a classification code can be classified by a meaning of the classification code. Meanwhile, equivalent reference data associated with an attribute identifier is not classified by a meaning of the attribute identifier. An attribute node associated with an entity identifier is not classified by a meaning of the entity identifier. This is because an entity identifier and an attribute identifier both represent only the same relationship, namely, "have".

Feature data is data not related to a word. Examples of feature data include image data, sound data, temperature data of a temperature sensor, taste data of a taste sensor, and smell data of a smell sensor.

Image data may be the following data, as an example. An image captured by an image sensor such as a pickup tube or a CCD is converted to an electrical signal. The electrical signal may be an analog signal or a digital signal. In the case where the electrical signal is a digital signal, one image is segmented into a plurality of cells. The image is converted to an electrical signal representing a level of brightness or a type of color by a numeric value, for each cell. Pattern data generated by arranging these numeric values in predetermined order is image data. The numeric values are often expressed in binary, though the numeric values may be expressed by methods other than binary.

Sound data may be the following data, as an example. A sound is converted to an electrical signal by the microphone. The sound converted to the electrical signal is separated for each predetermined frequency band, and a strength of the sound is represented by a numeric value for each frequency band. Pattern data generated by arranging these numeric values in predetermined order is sound data. The numeric values are often expressed in binary, though the numeric values may be expressed in a character code. The numeric values may also be expressed by other methods.

Temperature data may be the following data, as an example. Information obtained from the temperature sensor is converted to an electrical signal. Resulting numeric value data expressed in a character code, binary, or the like is temperature data.

Taste data may be the following data, as an example. A strength of taste detected by the taste sensor is represented by a numeric value for each element of taste such as sweetness, saltiness, and sourness. Pattern data generated by arranging these numeric values in predetermined order is taste data.

The same applies to other data not related to a word.

An example of a logic operation for an attribute node is described below, with reference to FIG. 1 and a simplified flowchart in FIG. 5.

Figure 5:
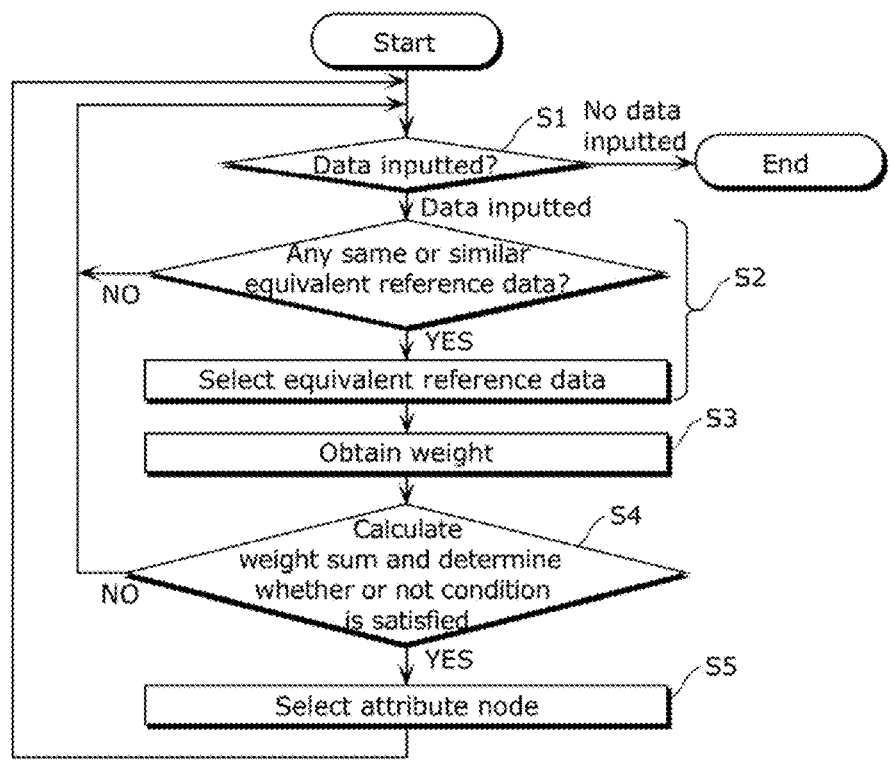
FIG. 5 is a flowchart relating to an operation for an attribute node in the operation system according to the embodiment of the present invention.

A word "rose" expressed in a character code is inputted (Step S1 in FIG. 5). The input data "rose" is identification data. The logic operation system is searched for equivalent reference data that is determined to be the same as or similar to the given identification data "rose". Note here that determining to be the same or similar is collectively referred to as "determining to be the same". In FIG. 1, the identification data 1 which is equivalent reference data "rose" is present in the logic operation system, so that the equivalent reference data "rose" 1 determined to be the same as the given identification data is selected (Step S2 in FIG. 5). The whole identification data 1 which is equivalent reference data determined to be the same as the given data and selected is associated with the attribute node 3. The equivalent reference data determined to be the same is not divided into equivalent reference data segments which are each associated with the attribute node. There is only one weight of association between the equivalent reference data and the attribute node. This weight of association is obtained. The weight 2 of the association is 1.0 (Step S3 in FIG. 5). A weight sum is calculated for the attribute node 3, and whether or not the weight sum satisfies a condition is determined. Suppose it is predetermined to select the attribute node in the case where a condition that the weight sum is equal to or more than 1.0 is satisfied (Step S4 in FIG. 5). Since the condition is satisfied, the attribute node 3 is selected (Step S5 in FIG. 5). Thus, the condition may be satisfied by a single piece of equivalent reference data. In this case, the process of summation can be omitted. In the case where the equivalent reference data is determined to be not the same as the given data, the process of obtaining the weight of association between the equivalent reference data and the attribute node and calculating the weight sum is not performed. In the case where the weight sum does not satisfy the condition, the attribute node is not selected. Only in the case where the equivalent reference data is determined to be the same as the given data, the weight between the equivalent reference data and the attribute node is obtained, and only each weight obtained for the attribute node is summed. Here, not each product of equivalent reference data and its corresponding weight is summed, but only each weight is summed and whether or not the weight sum satisfies the condition is determined. The determination of whether or not the condition is satisfied is made without using the sum of each product of equivalent reference data and its corresponding weight. That is, the input data and the attribute node are not associated with each other, the weight between the input data and the attribute node is not obtained, and the product of the input data and the attribute node is not calculated.

Though not shown in the flowchart in FIG. 5, when the attribute node 3 is selected, any piece of equivalent reference data associated with the attribute node 3 can be obtained. Thus, by selecting the attribute node based on the given data, any other piece of equivalent reference data associated with the attribute can be obtained. Information relating to the given data can be displayed by displaying, on the display device, image data or a word as identification data of the obtained other piece of equivalent reference data. In the case where the obtained other piece of equivalent reference data is sound data, the sound can be outputted from the speaker.

The same procedure is used in the case of obtaining an entity node. The entity node 9 associated with the attribute node 3 is obtained. The weight 4 of association between the attribute node 3 and the entity node 9 is 1.0. That is, a weight sum of association between the entity node 9 and the selected attribute node is 1.0. Since the weight sum satisfies the above-mentioned condition, the entity node 9 is selected. Thus, the condition may be satisfied by a single attribute. The process of calculating the weight sum and determining whether or not the condition is satisfied is the same as the process for equivalent reference data and an attribute node. In the case where the weight sum does not satisfy the condition, the entity node is not selected.

When the entity node 9 is selected, any attribute node associated with the entity node 9 can be selected. Thus, by selecting the entity node based on the given data, the entity can be recognized. Any other attribute node associated with the recognized entity can be selected, and any piece of equivalent reference data associated with this attribute node can be displayed on the display device.

Note that to obtain an attribute node or an attribute means to obtain an attribute identifier of the attribute node or the attribute, and to select an attribute node or an attribute means to select an attribute identifier of the attribute node or the attribute. The same applies to an entity node and an entity. Neither an attribute identifier nor an entity identifier is compared with equivalent reference data. An attribute identifier merely uniquely identifies an attribute and an attribute node. An entity identifier merely uniquely identifies an entity and an entity node. Equivalent reference data may be the equivalent reference data itself, or a pointer to the equivalent reference data.

Examples of use of weights are described below.

A weight representing a strength of relatedness (hereafter simply referred to as a weight) between identification data "flower language", which is equivalent reference data associated with the attribute node 3, and the attribute node 3 is 0.4. A weight of "passion" is 0.4. A weight of "red" is 0.4. A weight of "rose" is 1.0.

Suppose only the identification data "flower language", "red", and "passion" are given. Three pieces of identification data which are equivalent reference data same as these three pieces of identification data are associated with the attribute node 3, so that the weights of the three pieces of equivalent reference data are summed. The sum of 0.4, 0.4, and 0.4 is 1.2. Only in the case where the weight sum satisfies the above-mentioned condition, the associated attribute node 3 is selected. Since the sum is 1.2 which is equal to or more than 1.0, the above-mentioned condition is satisfied. Accordingly, the attribute node 3 is selected.

Suppose only the identification data "flower language" and "red" are given. Since the weight sum is 0.8, the above-mentioned condition is not satisfied. Accordingly, the attribute node 3 is not selected.

Suppose only the identification data "rose" is inputted. Since the weight sum is 1.0, the above-mentioned condition is satisfied. Accordingly, the attribute node 3 is selected. The same applies to the feature data 5 associated with the attribute node 7.

Thus, the use of weights enables a logic expression to be expressed and a logic operation to be performed without describing the logic expression, simply by associating identification data or feature data with an attribute node. A logic expression in FIG. 1 is as follows:

"rose" OR ("flower language" AND "red" AND "passion") OR [image data of rose].

In other words, for each attribute node, each combination of at least one piece of equivalent reference data that, when any one piece of equivalent reference data is removed from the combination, no longer satisfies the condition is selected from combinations of at least one piece of equivalent reference data satisfying the condition. That is, minimum combinations are selected. All pieces of equivalent reference data in each minimum combination are connected by AND, and the minimum combinations in each of which the pieces of equivalent reference data are connected by AND are connected by OR, thereby generating a logic expression. This logic expression may be modified by Boolean algebra to another logic expression. When the pieces of equivalent reference data connected by AND, for example, "flower language", "red", and "passion", are selected, the attribute node 3 can be selected. When the attribute node 3 is selected, all pieces of equivalent reference data associated with the attribute node 3 can be selected. When at least one of the minimum combinations of at least one piece of equivalent reference data is selected, the associated attribute node can be selected. Once the attribute node is selected, all pieces of equivalent reference data associated with the attribute node can be always selected. Once the attribute node is selected, all pieces of equivalent reference data associated with the attribute node are always true. The attribute node and each minimum combination of at least one piece of equivalent reference data associated with the attribute node are equivalent.

Suppose the weight of association between the identification data "red" which is equivalent reference data and the attribute node 3 is changed to 0.6. In this case, the sum of the weight between "red" and the attribute node 3 and the weight between "passion" and the attribute node 3 is 1.0, which satisfies the above-mentioned condition. Likewise, the sum of the weight between "red" and the attribute node 3 and the weight between "flower language" and the attribute node 3 is 1.0, which satisfies the above-mentioned condition. This being so, the logic expression in FIG. 1 changes as follows:

"rose" OR ("red" AND "flower language") OR ("red" AND "passion") OR [image data of rose].

Thus, a weight change can not only change a logic expression, but also change a degree of influence of individual equivalent reference data on a logic operation result. One piece of equivalent reference data as a whole is one logic variable, and is associated with one attribute node. There is single association between one piece of equivalent reference data and one attribute node, and one weight is assigned to the association. Even when the association between the piece of equivalent reference data and the attribute node is unchanged, a change of the weight leads to a change of the logic expression.

Conventional symbolic logic is binary logic which deals with only two values, e.g. 0 if "red" and 1 if not "red". In the example shown in FIG. 1, the weight of "red" is 0.4 or 0.6. A weight sum is calculated for an attribute node, and whether or not to select the attribute node is determined through comprehensive determination of equivalent reference data. This differs from a method of summing each product of equivalent reference data and its corresponding weight as in a neural network. FIG. 1 represents a logic expression of comprehensively determining equivalent reference data, where a logic operation, search, and inference of comprehensively determining equivalent reference data are performed. Though the above describes the association between equivalent reference data and an attribute node, the same applies to the association between an attribute node and an entity node and the association between entity nodes. Such associated equivalent reference data, attribute node, and entity node constitute a knowledge base for accumulating information of which attribute an entity has and which equivalent reference data the attribute has The logic operation system according to the present invention performs a logic operation, search, and inference on this knowledge base.

Note that a weight is not limited to a numeric value. A weight may be a symbol such as an alphabet. When a weight is a numeric value, however, summation can be easily performed. The above-mentioned condition is not limited to "equal to or more than a threshold". The condition may be whether or not the weight sum is within a predetermined range, whether or not the weight sum is "less than a threshold", or whether or not the weight sum is "equal to or less than a threshold". The condition is not limited to these.

Though the term "summation" is used above, this does not simply mean addition of numeric values. Weights are used to determine whether or not the condition is satisfied, or weights are combined to determine whether or not the condition is satisfied. Weights may be not directly used but converted. For example, weights may be converted by an exponential function or a logarithmic function. Weights of identification data may be multiplied by 1.5 before being added.

Weights may be limited to positive values, and multiplied to calculate a weight sum. When there is a weight less than 1, the weight sum is small. When there is a weight more than 1, the weight sum is large. The method of summation is not limited to these.

As mentioned earlier, a weight sum is calculated regardless of whether or not there is a dependency relationship between pieces of equivalent reference data, and a weight sum is calculated regardless of whether or not there is a dependency relationship between attribute nodes. In a Bayesian network, on the other hand, only when there is a dependency relationship between events, their probabilities can be combined.

Moreover, as mentioned earlier, given data and equivalent reference data are compared and, only in the case where the given data and the equivalent reference data are determined to be the same, each weight of association between the equivalent reference data and an attribute node is summed for the attribute node. In a neural network, on the other hand, each product of an input data value and its corresponding weight is summed, without comparison between given data and equivalent reference data.

Note that a plurality of attribute nodes may be simultaneously selected.

A weight representing a strength of relatedness between an attribute node and an entity node associated with each other may be provided. FIG. 2 is a diagram showing a data structure in which the feature data and the identification data in FIG. 1 are omitted and new attribute nodes 10 and 11 are added. The weight 4 representing the strength of relatedness between the attribute node 3 and the entity node 9 is 1.0. A weight 12 between the attribute node 10 and the entity node 9 is 0.5. A weight 13 between the attribute node 11 and the entity node 9 is 0.5. The weight 8 between the attribute node 7 and the entity node 9 is 1.0.

Suppose the attribute nodes 10 and 11 are selected. The weight sum of these attribute nodes for the entity node 9 is 1.0. When the threshold is 1.0, the condition that the weight sum is equal to or more than the threshold is satisfied. In this case, the associated entity node 9 is selected. Suppose the attribute node 3 is selected. Since the weight 4 between the attribute node 3 and the entity node 9 is 1.0 which is equal to or more than the threshold, the entity node 9 is selected.

Thus, the use of weights enables a logic operation to be performed without describing a logic expression, simply by associating an attribute node and an entity node with each other. The above-mentioned process has the same meaning as the following logic expression:

attribute node 3 OR (attribute node 10 AND attribute node 11) OR attribute node 7.

As explained with regard to the association between identification data or feature data and an attribute node, a more flexible logic operation than binary logic can be performed for the association between an attribute node and an entity node, too. The process of calculating the weight sum and determining whether or not the condition is satisfied is the same as the process for equivalent reference data and an attribute node. For each entity node, each combination of at least one attribute node that, when any one attribute node is removed from the combination, no longer satisfies the condition is selected from combinations of at least one attribute node satisfying the condition. That is, minimum combinations satisfying the condition are selected. All attribute nodes in each minimum combination are connected by AND, and the minimum combinations in each of which the attribute nodes are connected by AND are connected by OR, thereby generating a logic expression. When at least one of the minimum combinations of at least one attribute node is selected, the entity node associated with the combination is selected. Once the entity node is selected, all attribute nodes associated with the entity node can be always selected. Once the entity node is selected, all attribute nodes associated with the entity node are always true. The entity node and each minimum combination of at least one attribute node associated with the entity node are equivalent.

Note that a plurality of entity nodes may be simultaneously selected.

FIG. 3 is a diagram showing a data structure of entity nodes alone. Attribute nodes, identification data, and feature data are omitted in FIG. 3. As shown in FIG. 3, an entity node can be associated with another entity node. The association makes It possible to represent relatedness between the entity node and the other entity node. A weight representing a strength of relatedness between the entity node and the other entity node associated with each other may be provided.

In the case where an entity node is associated with another entity node, whether or not to select the other entity node can be determined by comprehensively determining its weight, as in the case where identification data or feature data which is equivalent reference data is associated with an attribute node.

Suppose the entity node 9 and an entity node 14 are selected. A weight 16 between the entity node 9 and an entity node 15 is 0.9. A weight 17 between the entity node 14 and the entity node 15 is 0.7. Summing the two weights yields 1.6. The weight sum for the entity node 15 satisfies the above-mentioned condition, so that the entity node 15 is selected. The process of calculating the weight sum and determining whether or not the condition is satisfied is the same as the process for equivalent reference data and an attribute node.

The weight 16 between the entity nodes 15 and 9 is 0.9, whereas the weight 17 between the entity nodes 15 and 14 is 0.7. Suppose it is predetermined to select an entity node that satisfies a condition of having a largest weight. In such a case, the entity node 9 is selected from the entity node 15.

A weight can be equally used when obtaining an attribute node associated with an entity node. A weight can be equally used when obtaining identification data or feature data which is equivalent reference data associated with an attribute node.

When no weight is set, a default value may be automatically set. A value satisfying the condition may be automatically set. In the case where no weight is set, it may be assumed that a default value is set. A value satisfying the condition may be used as such a default value. This means that the condition is always satisfied when no weight is set.

Figure 6:
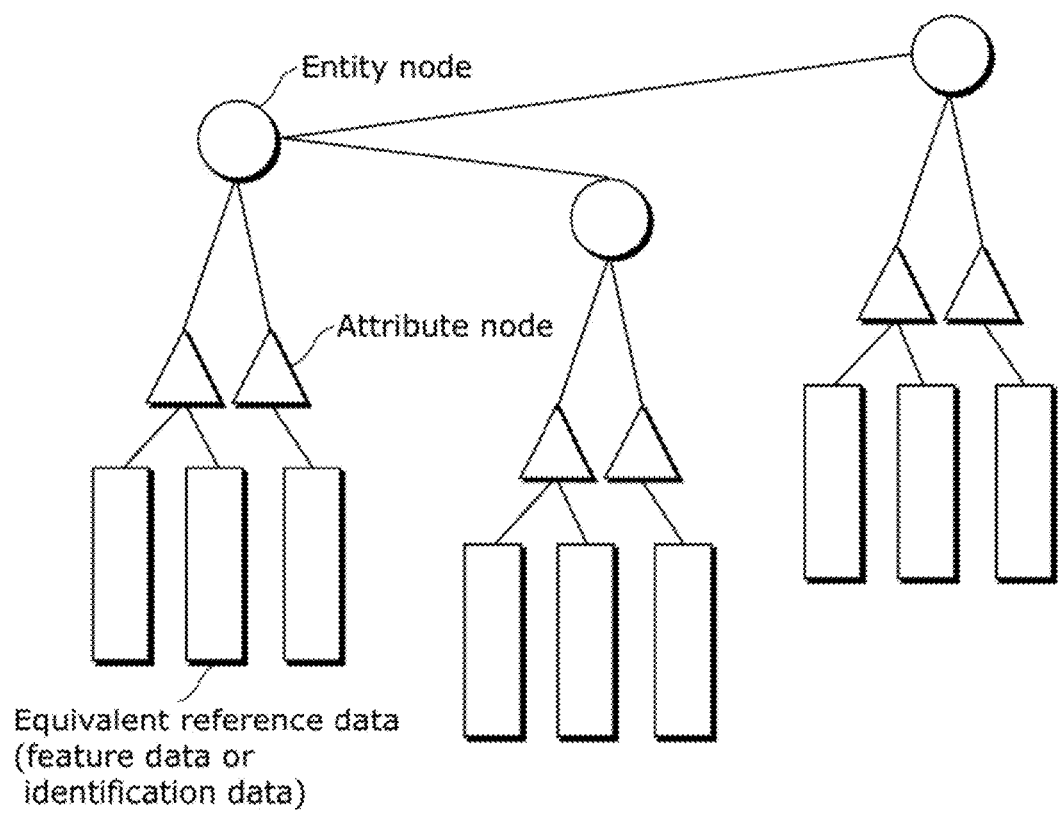
FIG. 6 is a diagram showing a data structure of the operation system according to the embodiment of the present invention.

FIG. 6 is a diagram showing a data structure of the logic operation system according to the embodiment of the present invention.

All attribute nodes represent the same relationship of "having" equivalent reference data. The represented relationship does not differ depending on the attribute node. The relationship represented by each attribute node is irrelevant to equivalent reference data associated with the attribute node and irrelevant to the attribute node. Since all attribute nodes represent the same relationship, the relationship represented by each attribute node does not distinguish equivalent reference data. For an attribute identifier of each attribute node, the number of sets of association between the attribute identifier and at least one piece of equivalent reference data is only one.

Note that an entity node and an attribute node are conceptual nodes. In the case where there is an upper limit to the number of attribute nodes that can be associated with one entity node, association exceeding the upper limit may be made in such a manner that physically a plurality of entity nodes have the same entity identifier and the association of one conceptual entity node is represented by the plurality of physical entity nodes. Even in this case, it is assumed that there is conceptually one entity node. The same applies to an attribute node.

All entity nodes represent the same relationship of "having". The relationship represented by each entity node is irrelevant to an attribute node and equivalent reference data associated with the entity node. Since all entity nodes represent the same relationship, the relationship represented by each entity node does not distinguish an attribute node and equivalent reference data associated with the entity node. For each entity node, the number of sets of association between the entity node and at least one attribute node is only one. For each attribute node, the number of sets of association between the attribute node and at least one piece of equivalent reference data is only one. That is, for each entity identifier, the number of sets of association between the entity identifier and at least one attribute identifiers is only one. For each attribute identifier, the number of sets of association between the attribute identifier and at least one piece of equivalent reference data is only one.

Equivalent reference data is associated with an entity node via an attribute node. Entity nodes are directly associated with each other, which represents a relationship between entities associated with each other. An attribute node is a unit of a concept or a meaning. Feature data which is equivalent reference data associated with an attribute node is a substance of a meaning or a concept. Identification data which is equivalent reference data associated with an attribute node is a word indicating a meaning or a concept. By associating an attribute node with an entity node, a meaning or a concept of the entity node is defined.

No dependency relationship between pieces of equivalent reference data associated with one attribute node is necessary. A weight sum is calculated regardless of whether or not there is a dependency relationship between pieces of equivalent reference data. No dependency relationship between attribute nodes associated with one entity node is necessary. A weight sum is calculated regardless of whether or not there is a dependency relationship between attribute nodes.

For one entity node and at least one attribute node associated with the entity node, once a combination of at least one attribute node satisfying the above-mentioned condition is selected, the associated entity node can be selected. Moreover, once the entity node is selected, any associated attribute node can be unconditionally selected. This is bidirectional association. Thus, bidirectional selection is ensured. When selection can be made in one direction, selection can also be made in a reverse direction without fail.

In the case where, for one entity node, a weight sum of at least one attribute node satisfies a predetermined condition, the entity node can be selected. Once the entity node is selected, the entity node and all attribute nodes associated with the entity node can be always selected.

In the case where the above-mentioned condition is satisfied by a single weight, the process of calculating the weight sum and determining whether or not the weight sum satisfies the condition can be omitted.

Although only an exemplary embodiment of the present invention has been described in detail above, those skilled in the art will readily appreciate that many modifications are possible in the exemplary embodiments without materially departing from the novel teachings and advantages of the present invention. Accordingly, all such modifications are intended to be included within the scope of the present invention.

The present invention is applicable not only as a logic operation system, but also as an operation system that performs a logic operation according to the present invention, a search system that performs search using a logic operation according to the present invention, an inference system that performs inference using a logic operation according to the present invention, and a knowledge base system that performs search or inference using a logic operation by the logic operation method according to the present invention.

The use of analog values, such as 0.1, as weights makes it possible to easily realize a logic operation based on analog values. In addition, a logic operation result can be flexibly changed by a weight change. These advantageous effects are hard to achieve by conventional binary logic.

When the three words "flower language", "red", and "passion" are given, an image of a rose or roses or the word "rose" can be displayed on the display device. Thus, according to the present invention, it is possible to establish a search system that, when one or more words are given, displays information related to the given words. It is also possible to establish a search system that, when image data of a flower is given, displays a name of the flower. A search system for association can be provided.

Moreover, according to the present invention, it is possible to establish a search system that does not include identification data as equivalent reference data. For example, when image data is given, the search system can display another image related to the given image. When sound data is given, the search system can output a sound related to the given sound data or display an image related to the given sound data.

The present invention may be realized not only as an information system having a search function, but also as electronic equipment having a function of an electronic dictionary and/or an electronic encyclopedia. The present invention may also be realized as an artificial intelligence system including the search system according to the present invention. The artificial intelligence system is applicable as a diagnostic support system or a recognition system that recognizes words, sounds, or images.

In detail, a weight sum of selected equivalent reference data is calculated to comprehensively perform a logic operation. An attribute node is obtained based on a result of the logic operation, and further an entity node associated with the obtained attribute node is obtained.

It can be considered that the search system according to the present invention stores feature data or identification data which is equivalent reference data, as a criterion for determining sameness. Feature data or identification data as such a criterion for determination is associated with an attribute node, and the attribute node is associated with an entity node.

When identification data or feature data is given, search is performed for equivalent reference data determined to be the same as the given data. In the case where there is equivalent reference data determined to be the same, an attribute node associated with the equivalent reference data determined to be the same is obtained. Here, the above-mentioned weight sum-based determination may be performed. An entity node associated with the obtained attribute node is further obtained. Here, too, the above-mentioned weight sum-based determination may be performed.

In the search system according to the embodiment of the present invention, an attribute node is typified by associating identification data or feature data with the attribute node. Moreover, an entity node is typified by the attribute. Through identification data or feature data, the search system according to the present invention holds information for typifying an attribute node and an entity node. When identification data or feature data is given, the search system according to the present invention determines which type of attribute node corresponds to the given combination of at least one piece of identification data or feature data. The search system according to the present invention then determines which type of entity node corresponds to the combination of at least one attribute typified by the given combination of identification data or feature data.

An entity has an attribute which is a property of the entity. An attribute has identification data for associating the attribute with a word and feature data which is a substance of the attribute, and is characterized by these data. In the search system according to the embodiment of the present invention, an entity node means an entity, and an attribute node means an attribute. This indicates that the above-mentioned process is a process of recognizing an attribute or an entity typified by identification data or feature data beforehand, by given identification data or feature data.

The present invention is also applicable as a search system in which the components according to the present invention are partly or wholly connected via a network. For example, an information system in which a computer terminal that includes an input/output device and receives identification data or feature data and outputs a search result is connected via a network such as the Internet is applicable. An information system in which a computer terminal that receives data of a camera, a microphone, a sensor, and the like is connected via a network such as the Internet is applicable, too.

Examples of the network include, but are not limited to, a wired network and a wireless network.

The present invention may also be realized as a logic operation method, a computer program for executing one or more steps of the logic operation method, a recording medium such as a CD-ROM, a nonvolatile memory including a flash memory, a magnetic recording medium including a flexible disk, or an magneto-optic recording medium including a MO or a storage device such as a hard disk device on which the computer program is recorded, or a computer system that receives the computer program via a network and executes the received computer program. The present invention may also be realized as an integrated circuit for achieving part or all of the logic operation method according to the present invention. The present invention can further be realized as a search system in which the integrated circuit for achieving part or all of the components according to the present invention is mounted on a printed board.

The present invention is also applicable as an electronic dictionary, a diagnostic support system, or a recognition system.

When a symptom is inputted in a word, the symptom is given as identification data, and an attribute node associated with the identification data is obtained and further an entity node associated with the attribute node is obtained. A disease name or another symptom associated with another attribute node that is associated with the entity node is displayed on a display device. Image data of a typical symptom may be displayed. A diagnosis is supported in this way. The same procedure is used in a recognition system, too.

The above description is only illustrative and is not to be construed as limiting the present invention.

The invention claimed is:

1. A logic operation system, comprising:
a storage unit configured to store data; and
an operation unit configured to perform an operation on the data stored in the storage unit,
wherein the data stored in the storage unit includes at least one attribute and each attribute is assigned an attribute identifier for uniquely identifying the attribute,
each attribute identifier is associated with at least one piece of equivalent reference data and each piece of equivalent reference data is data representing the corresponding attribute,
for each attribute identifier, a number of sets of association between the attribute identifier and the at least one piece of equivalent reference data is one,
each attribute identifier is not a word representing a corresponding attribute, and is made of a symbol that identifies the corresponding attribute, the symbol per se having no meaning with respect to the at least one piece of equivalent reference data associated with each attribute identifier,
each piece of equivalent reference data is feature data or identification data, the feature data being a substance of an associated attribute, and the identification data being data for identifying the associated attribute,
the data stored in the storage unit includes, for each attribute identifier, a weight of association between the attribute identifier and each piece of equivalent reference data, the weight representing a degree of relatedness between the corresponding attribute and the piece of equivalent reference data associated with each other, and
the operation unit is configured to, 1) when data is given, determine whether or not the given data is the same as a piece of equivalent reference data in the storage unit, 2) when the given data is determined to be the same as the piece of equivalent reference data, obtain the weight of association between the piece of equivalent reference data determined to be the same and an attribute identifier associated with the piece of equivalent reference data, 3) when the weight is obtained for the attribute identifier, calculate a sum of the weight obtained for the attribute identifier, and 4) when the sum of the weight obtained for the attribute identifier is calculated, select the attribute identifier in the case where the sum satisfies a predetermined condition.

2. The logic operation system according to claim 1, wherein the identification data includes text data.

3. The logic operation system according to claim 1, wherein the data stored in the storage unit includes at least one entity identifier for uniquely identifying an entity, and at least one attribute of the entity where the at least one attribute is associated with the entity identifier,
for each entity identifier, a number of sets of association between the entity identifier and at least one attribute identifier of a respective at least one attribute is one, and
each entity identifier is not a word representing the corresponding entity, and is made of a symbol that identifies the corresponding attribute, the symbol per se having no meaning of the entity.

4. The logic operation system according to claim 3, wherein the data stored in the storage unit includes, for each entity identifier, a weight of association between the entity identifier and each attribute identifier, the weight representing a degree of relatedness between the entity identifier and the attribute identifier associated with each other, and
the operation unit is configured to 1) when an attribute identifier is selected, obtain the weight of association between the selected attribute identifier and an entity identifier associated with the selected attribute identifier, 2) when the weight is obtained for the entity identifier, calculate a sum of the weight obtained for the entity identifier, and 3) when the sum of the weight obtained for the entity identifier is calculated, select the entity identifier in the case where the sum satisfies a predetermined condition.

5. The logic operation system according to claim 3, wherein an entity identifier is associated with another entity identifier, and
the operation unit is configured to, when an entity identifier is selected, select the other entity identifier associated with the selected entity identifier.

6. The logic operation system according to claim 5, wherein the data stored in the storage unit includes a weight of association between an entity identifier and the other entity identifier, the weight representing a degree of relatedness between the entity identifier and the other entity identifier associated with each other, and
the operation unit is configured to 1) when an entity identifier is selected, obtain the weight of association between the selected entity identifier and other entity identifier associated with the selected entity identifier, 2) when at least one weight is obtained for the other entity identifier, calculate a sum of the weight obtained for the other entity identifier, and 3) when the sum of the weight obtained for the other entity identifier is calculated, select the other entity identifier in the case where the sum satisfies a predetermined condition.

7. The logic operation system according to claim 1, wherein the operation unit is configured to change the weight.

8. A logic operation method, comprising:
performing, using an operation unit, an operation on data stored in a storage unit,
wherein the storage unit stores data,
the data stored in the storage unit includes at least one attribute and each attribute is assigned an attribute identifier for uniquely identifying the attribute,
each attribute identifier is associated with at least one piece of equivalent reference data and each piece of equivalent reference data is data representing the corresponding attribute, for each attribute identifier, a number of sets of association between the attribute identifier and the at least one piece of equivalent reference data is one, each attribute identifier is not a word representing a corresponding attribute, and is made of a symbol that identifies the corresponding attribute, the symbol per se having no meaning with respect to the at least one piece of equivalent reference data associated with each attribute identifier, each piece of equivalent reference data is feature data or identification data, the feature data being a substance of an associated attribute, and the identification data being data for identifying the associated attribute, the data stored in the storage unit includes, for each attribute identifier, a weight of association between the attribute identifier and each piece of equivalent reference data, the weight representing a degree of relatedness between the corresponding attribute and the piece of equivalent reference data associated with each other, and in the performing step, the operation unit, 1) when data is given, determines whether or not the given data is the same as a piece of equivalent reference data in the storage unit, 2) when the given data is determined to be the same as the piece of equivalent reference data, obtaining a weight of association between the piece of equivalent reference data determined to be the same and an attribute identifier associated with the piece of equivalent reference data, 3) when the weight is obtained for the attribute identifier, calculate a sum of the weight obtained for the attribute identifier, and 4) when the sum of the weight obtained for the attribute identifier is calculated, select the attribute identifier in the case where the sum satisfies a predetermined condition.

9. A non-transitory computer-readable recording medium for use in a computer, the computer-readable recording medium having data stored in a storage unit wherein the data stored in the storage unit includes at least one attribute and each attribute is assigned an attribute identifier for uniquely identifying the attribute, each attribute identifier is associated with at least one piece of equivalent reference data and each piece of equivalent reference data is data representing the corresponding attribute, for each attribute identifier, a number of sets of association between the attribute identifier and the at least one piece of equivalent reference data is one, each attribute identifier is not a word representing a corresponding attribute, and is made of a symbol that identifies the corresponding attribute, the symbol per se having no meaning with respect to the at least one piece of equivalent reference data associated with each attribute identifier, each piece of equivalent reference data is feature data or identification data, the feature data being a substance of an associated attribute, and the identification data being data for identifying the associated attribute, the data stored in the storage unit includes, for each attribute identifier, a weight of association between the attribute identifier and each piece of equivalent reference data, the weight representing a degree of relatedness between the corresponding attribute and the piece of equivalent reference data associated with each other, and the computer-readable recording medium also includes a logic operation program causing the computer to execute steps for performing a logic operation, the steps comprising:

performing an operation on data stored in the storage unit, which includes: 1) when data is given, determining whether or not the given data is the same as a piece of equivalent reference data in the storage unit, 2) when the given data is determined to be the same as the piece of equivalent reference data, obtaining a weight of association between the piece of equivalent reference data determined to be the same and an attribute identifier associated with the piece of equivalent reference data, 3) when the weight is obtained for the attribute identifier, calculate a sum of the weight obtained for the attribute identifier, and 4) when the sum of the weight obtained for the attribute identifier is calculated, select the attribute identifier in the case where the sum satisfies a predetermined condition.

* * * * *